United States Patent [19]

Umeyama et al.

[11] Patent Number: 5,025,680
[45] Date of Patent: Jun. 25, 1991

[54] TORSIONAL DAMPER TYPE FLYWHEEL DEVICE

[75] Inventors: Mitsuhiro Umeyama; Masaki Inui, both of Toyota; Kenichi Yamamoto, Okazaki; Kaoru Wakahara, Toyota, all of Japan

[73] Assignee: Toyota Jidosha Kabushiki Kaisha, Toyota, Japan

[21] Appl. No.: 396,312

[22] Filed: Aug. 21, 1989

[30] Foreign Application Priority Data

Sep. 28, 1988 [JP] Japan .................. 63-125621
Sep. 30, 1988 [JP] Japan .................. 63-244615

[51] Int. Cl.$^5$ .......................... F16E 15/10; F16D 3/14
[52] U.S. Cl. .................................... 74/574; 74/572; 74/573 R; 192/106.2
[58] Field of Search ............ 74/573 R, 574, 572; 192/106.2

[56] References Cited

U.S. PATENT DOCUMENTS

| | | | |
|---|---|---|---|
| 3,097,537 | 7/1963 | Peterson | 74/61 |
| 3,559,502 | 2/1971 | Lofthouse | 74/574 |
| 3,931,876 | 1/1976 | Beeskow et al. | 192/106.2 |
| 3,982,617 | 9/1976 | Worner | 192/106.2 |
| 3,983,982 | 10/1976 | Worner | 192/106.2 |
| 4,548,310 | 10/1985 | Maucher | 192/106.2 |
| 4,560,054 | 12/1985 | Kayanoki et al. | 192/106.2 |
| 4,663,983 | 5/1987 | Kobayashi et al. | 74/574 |
| 4,732,250 | 3/1988 | Maucher et al. | 74/574 |
| 4,767,380 | 8/1988 | Chasseguet et al. | 74/574 |
| 4,846,323 | 7/1989 | Fukushima | 74/574 |
| 4,947,706 | 8/1990 | Umeyama et al. | 74/574 |
| 4,950,204 | 8/1990 | Umeyama et al. | 74/574 X |
| 4,950,205 | 8/1990 | Umeyama | 74/574 X |

FOREIGN PATENT DOCUMENTS

| | | |
|---|---|---|
| 0259173 | 3/1988 | European Pat. Off. |
| 2593252 | 7/1987 | France |
| 56-35835 | 4/1981 | Japan |
| 63-42950 | 3/1988 | Japan |
| 63-42953 | 3/1988 | Japan |
| 63-53033 | 4/1988 | Japan |
| 63-132144 | 8/1988 | Japan |
| 63-178651 | 11/1988 | Japan |
| 63-178652 | 11/1988 | Japan |
| 950888 | 2/1964 | United Kingdom |
| 2163524 | 2/1986 | United Kingdom |
| 2186344 | 8/1987 | United Kingdom |

Primary Examiner—Rodney H. Bonck
Assistant Examiner—Winnie Yip
Attorney, Agent, or Firm—Cushman, Darby & Cushman

[57] ABSTRACT

A torsional damper type flywheel device wherein at least one of flywheel device components, for example, a spring connecting a drive side and a drive side of the flywheel device is asymmetric with respect to an axis of rotation of the flywheel device to form a total, original imbalance with respect to the axis of rotation. The flywheel device includes a compensating imbalance which is equal and opposite to the original imbalance as a vector and is equally divided into two portions each distributed to each of the drive side and the driven side. The compensating imbalance is formed in the drive side and the driven side before assembly of the flywheel device. When the drive side and driven side rotate relative to each other by a torsional angle $\theta$ and thus a gravity center of the asymmetrically arranged spring rotates by an angle $\theta/2$ about the axis of rotation, a vector defined by the two portions of the compensating imbalance also rotates by the angle $\theta/2$ about the axis of rotation. As a result, the flywheel device is maintained in balance at all torsional angles.

11 Claims, 6 Drawing Sheets

FIG. 10
PRIOR ART

TORSIONAL DAMPER TYPE FLYWHEEL DEVICE

BACKGROUND OF THE INVENTION

1. Field of the Invention

The present invention relates to a divisional type flywheel device as a torsional damper, hereinafter referred to as a torsional damper type flywheel device. More particularly, the present invention relates to a balancing structure for a torsional type flywheel device having asymmetrically arranged or configured members.

2. Description of the Prior Art

Balancing for a so-called divisional type flywheel device, that is, a flywheel device including a drive side flywheel and a driven side flywheel connected by springs is performed after assembly of the flywheel device by adding or removing a correction mass, for example, a hole of small size in either one of the drive side and driven side flywheels. In the prior art divisional type flywheel device, the components are symmetrically disposed relative to an axis of rotation of the flywheel device. Further, any pair of springs located opposite to each other with respect to the axis of rotation are in balance whether or not the springs are compressed and the gravity centers of the springs move around the axis of rotation. Therefore, providing such a small hole can effectively balance the flywheel.

However, if the flywheel device is one of the type which has components that are asymmetric with respect to an axis of rotation of the flywheel device, the following balancing problems are encountered.

First, the total, original imbalance of an asymmetric flywheel device can be as great as several times that of a conventional symmetrically constructed flywheel device. As a result, if an attempt is made to balance the asymmetric flywheel device by means of the prior art correction hole, a far greater amount of holes, in both number and size, than are required for a symmetrical flywheel. Thus, such balancing is undesirable and will deteriorate the characteristics of the flywheel device, for example, the structural strength of the flywheel device.

Figures 9, 10:
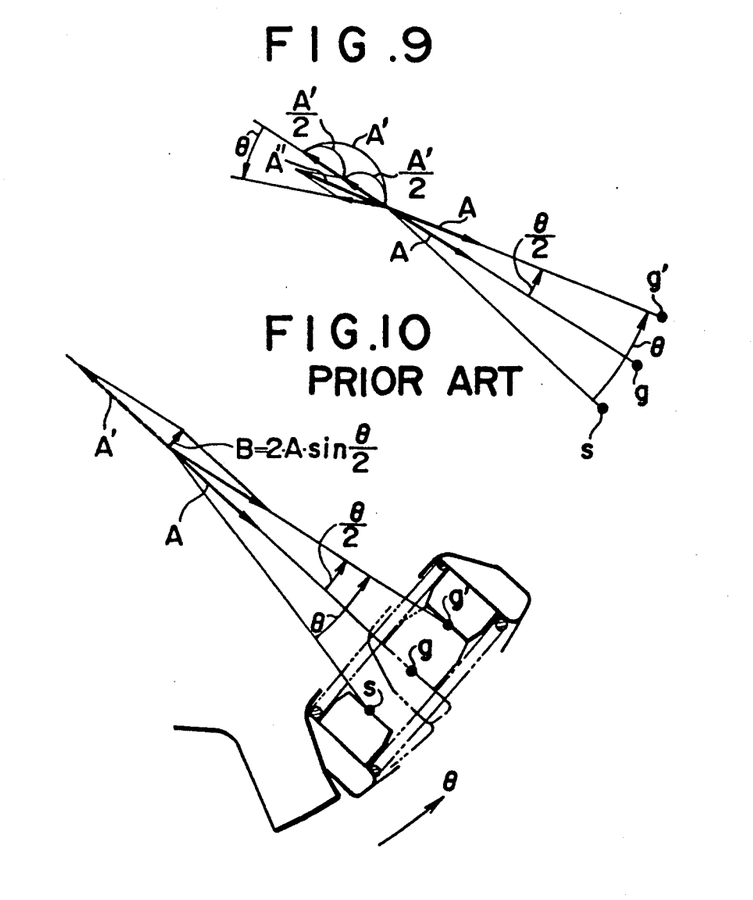
FIG. 9 is a vector diagram illustrating a relationship between a total, original imbalance and a compensating imbalance of the flywheel device of FIG. 1.
FIG. 10 is a vector diagram illustrating a relationship between a total, original imbalance and a compensating imbalance of a prior art flywheel device.

Second, when a torque acts on the flywheel device to cause relative rotation (torsion) between the drive side and driven side flywheels, the springs also stroke and the gravity centers of the springs move relative to the drive side and driven side flywheels about the axis of rotation. As a result, the direction of the total, initial imbalance of the flywheel device changes to be offset from the direction of the compensating imbalance fixed to either one of the drive side and driven side flywheels, accompanied by an increase in imbalance of the flywheel device. The foregoing will be discussed more fully below with reference to FIG. 10 which illustrates balancing of a flywheel device wherein the spring is asymmetrically arranged with respect to the axis of rotation and a prior art correction hole is provided in only the drive side flywheel In FIG. 10, when there is no relative rotation between the drive side and driven side flywheels, a total, original imbalance A due to the asymmetric arrangement of the spring and a compensating imbalance A' are in perfect balance. However, when a relative rotation of torsional angle $\theta$ occurs between the drive side and driven side flywheels, a gravity center of the spring moves about the axis of rotation by a half the torsional angle $\theta/2$ and moves from g to g'. As a result, the direction of the original imbalance A rotates about the axis of rotation by the angle $\theta/2$, while the direction of compensating unbalance A' is fixed to the drive side flywheel because the correction hole is formed in the drive side flywheel. Therefore, when a relative rotation occurs, another imbalance B is generated. The imbalance B can be calculated by the following equation:

$B = 2*A*\sin(\theta/2)$

When the torsional angle $\theta$ is 30°, the imbalance B can be calcurated to be as great as 52% of the original imbalance A. Such a great imbalance is unacceptable.

SUMMARY OF THE INVENTION

An object of the invention is to provide a torsional damper type flywheel, at least one portion of which is asymmetric with respect to an axis of rotation of the flywheel device to cause a total, original imbalance, wherein (a) the flywheel device can be maintained in balance whether or not a relative rotation occurs between a drive side and a driven side thereof and (b) balancing working after assembly of the flywheel device is minimal.

In accordance with the invention, the above-described object is attained by a torsional damper type flywheel device wherein at least one member of the flywheel device is asymmetrically arranged or configured with respect to an axis of rotation of the flywheel device to cause a total, original imbalance of the flywheel device and wherein the flywheel includes a compensating imbalance, equal and opposite to the original imbalance in vector, equally divided into two portions each distributed to each of a drive side and a driven side of the flywheel device. The compensating imbalance is formed in the flywheel device before assembly of the flywheel device.

In the flywheel device thus constructed, balance is maintained whether or not a relative rotation occurs between the drive side and the driven side. More particularly, with reference to FIG. 9, when no relative rotation exists between the drive side and driven side, a vector of the compensating imbalance A' is equal in magnitude and opposite in direction to a vector of the total, original imbalance A to thereby put the flywheel device in perfect balance. On the other hand, when a relative rotation $\theta$ occurs between the drive side and the driven side, a vector of one of the two portions of the compensating imbalance A'/2 rotates relative to the other A'/2 by the angle $\theta$ to thereby cause a compensating imbalance A" which is defined as a vector synthesis of the two compensating imbalance portions A'/2 and A'/2. Thus, the direction of the compensating imbalance A" is angularly offset from the direction of the initial compensating imbalance A' by an angle $\theta/2$. The total, original imbalance A also rotates by the angle $\theta/2$ from the initial position because the gravity center of the original imbalance A moves from point g to g'. Therefore, the compensating imbalance A" and the total, original imbalance A are opposite to each other in direction to tend to put the flywheel device in balance. However, a magnitude of the vector of the compensating imbalance A" is a little smaller than that of the original imbalance A. The magnitude of the vector of the compensating imbalance A" is calculated by the following equation:

$$A'' = 2 \cdot A'/2 \cdot \cos\theta/2 = A \cdot \cos\theta/2$$

Therefore, a new imbalance equal to a differential between the magnitude of the vector of the compensating imbalance A" and the magnitude of the original imbalance A will occur, and it is calculated as follows:

$$A - A'' = A \cdot (1 - \cos\theta/2)$$

When the torsional angle $\theta$ is 30°, the differential is calculated to be 0.03A as calculated below.

$$A = A'' = A - 0.97 \cdot A = 0.03 \cdot A$$

Thus, even if the torsional angle is as great as 30°, the new imbalance is as small as 3% of the original imbalance A and is of a negligible magnitude when compared with the imbalance of conventional devices which can be as great as 52%. This means that the flywheel device is maintained in balance even if a relative rotation occurs between the drive side and driven side.

In addition, because the compensating imbalance A' is formed before assembly of the flywheel device, balancing working after assembly of the flywheel device is minimal or, in some cases, will be unnecessary.

BRIEF DESCRIPTION OF THE DRAWINGS

The above and other objects, features and advantages of the invention will become apparent and will be more readily appreciated from the following detailed description of the preferred exemplary embodiment of the invention taken in conjunction with the accompanying drawings, in which.

DETAILED DESCRIPTION OF THE PREFERRED EMBODIMENTS

FIGS. 1 to 9 illustrate structures and characteristics of a torsional damper type flywheel device in accordance with one embodiment of the present invention.

Figure 3:
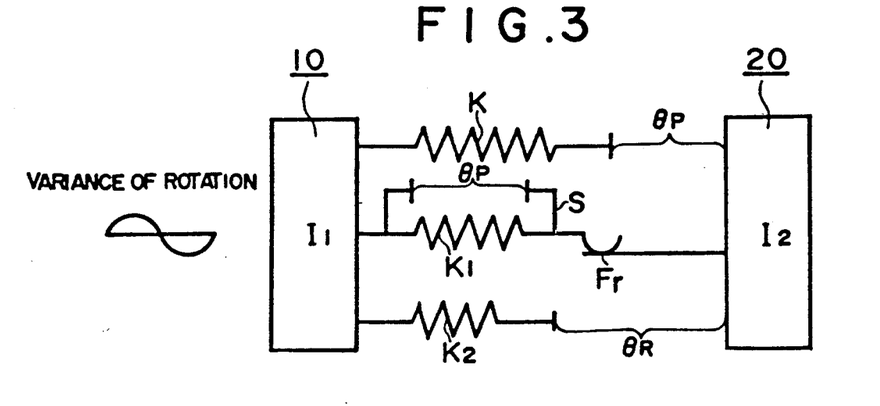
FIG. 3 is a system diagram illustrating a vibrational the flywheel device of FIG. 1.

For the purpose of more easily understanding the relatively complicated components of the flywheel device, a vibrational system thereof will be initially explained with reference to FIG. 3. In FIG. 3, moments of inertia of a drive side and a driven side of the torsional damper type flywheel device are denoted with references I1 and I2, respectively. A first spring, hereinafter a K spring, connects the moments of inertia I1 and I2 with an angular gap $\theta_P$. A second spring, hereinafter a K1 spring, is arranged in parallel with the K spring as a spring arrangement and connects the moments of inertia I1 and I2 via a friction mechanism arranged in series with the K1 spring. The friction mechanism is designed to begin sliding at a predetermined frictional force Fr when the K1 spring is compressed by an amount corresponding to angular gap $\theta_P$. A third spring, hereinafter a K2 spring, which is not an absolutely necessary component, is arranged in parallel with the K spring and the series combination of the K1 spring and the friction mechanism as a spring arrangement and connects the moments of inertia I1 and I2 via an angular gap $\theta_R$ greater than the angular gap $\theta_P$. These springs K, K1 and K2 constitute torsional dampers. A mechanism S for limiting the operation of the K1 spring between the torsional angle $+\theta_P$ and the torsional angle $-\theta_P$ is provided against the K1 spring.

Figure 4:
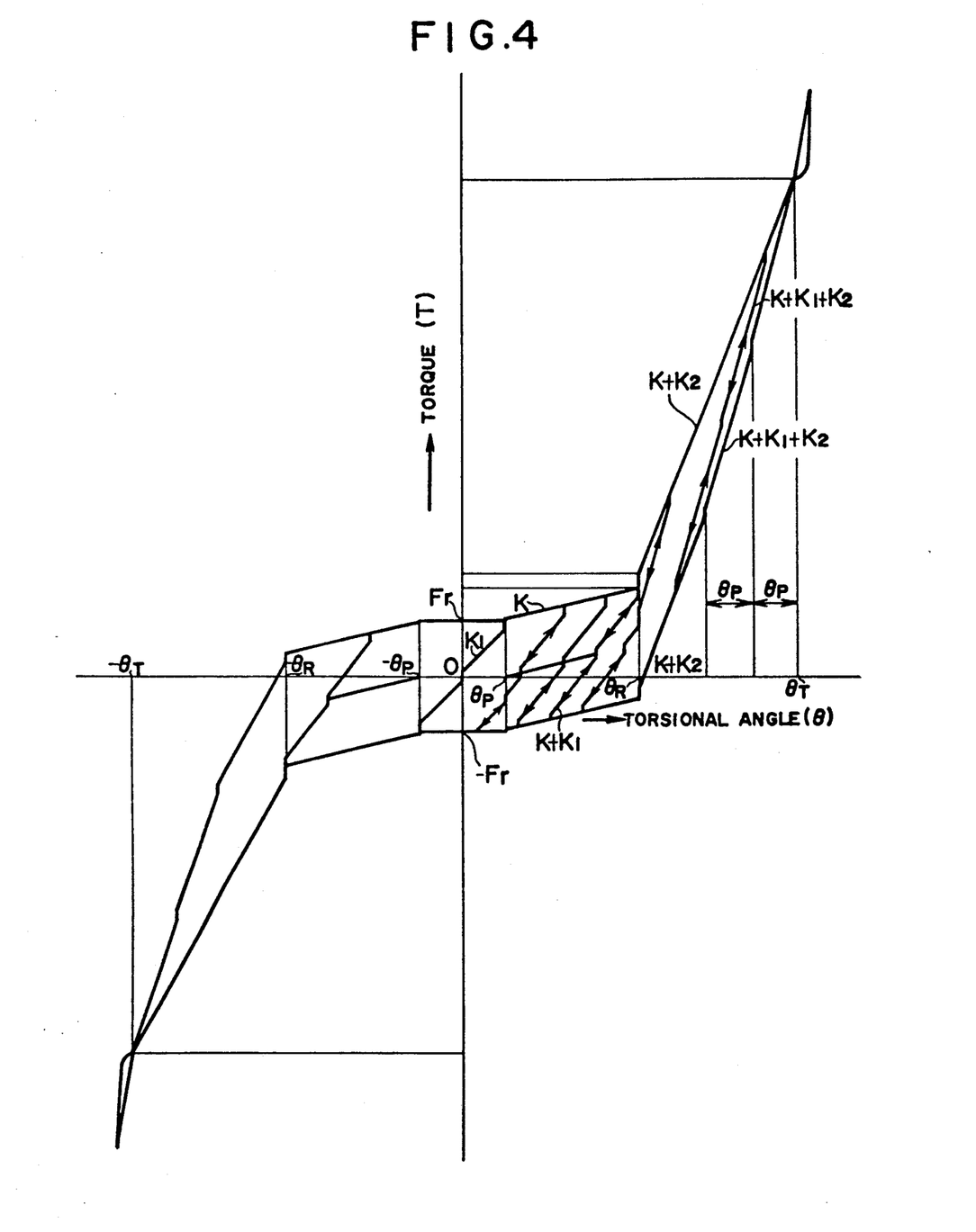
FIG. 4 is a diagram illustrating a torsional angle-torque characteristic of the flywheel device of FIG. 1.
Figure 5:
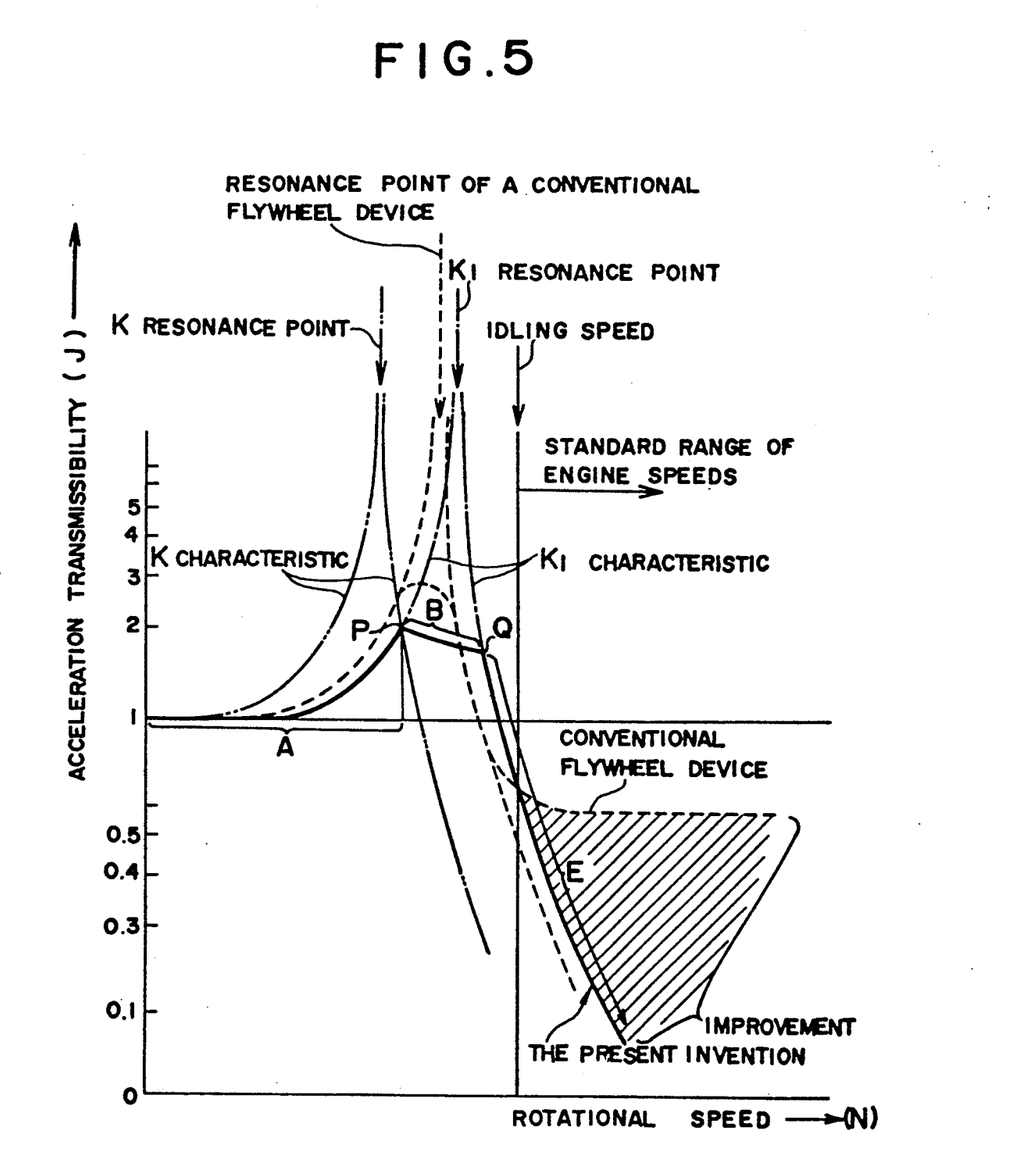
FIG. 5 is a graph illustrating a rotational speed-acceleration transmissibility characteristic of the flywheel device of FIG. 1.

The vibrational system of FIG. 3 has the torsional angle-torque characteristic shown in FIG. 4 and the rotational speed (engine speed)-acceleration transmissibility characteristic shown in FIG. 5.

Figure 1:
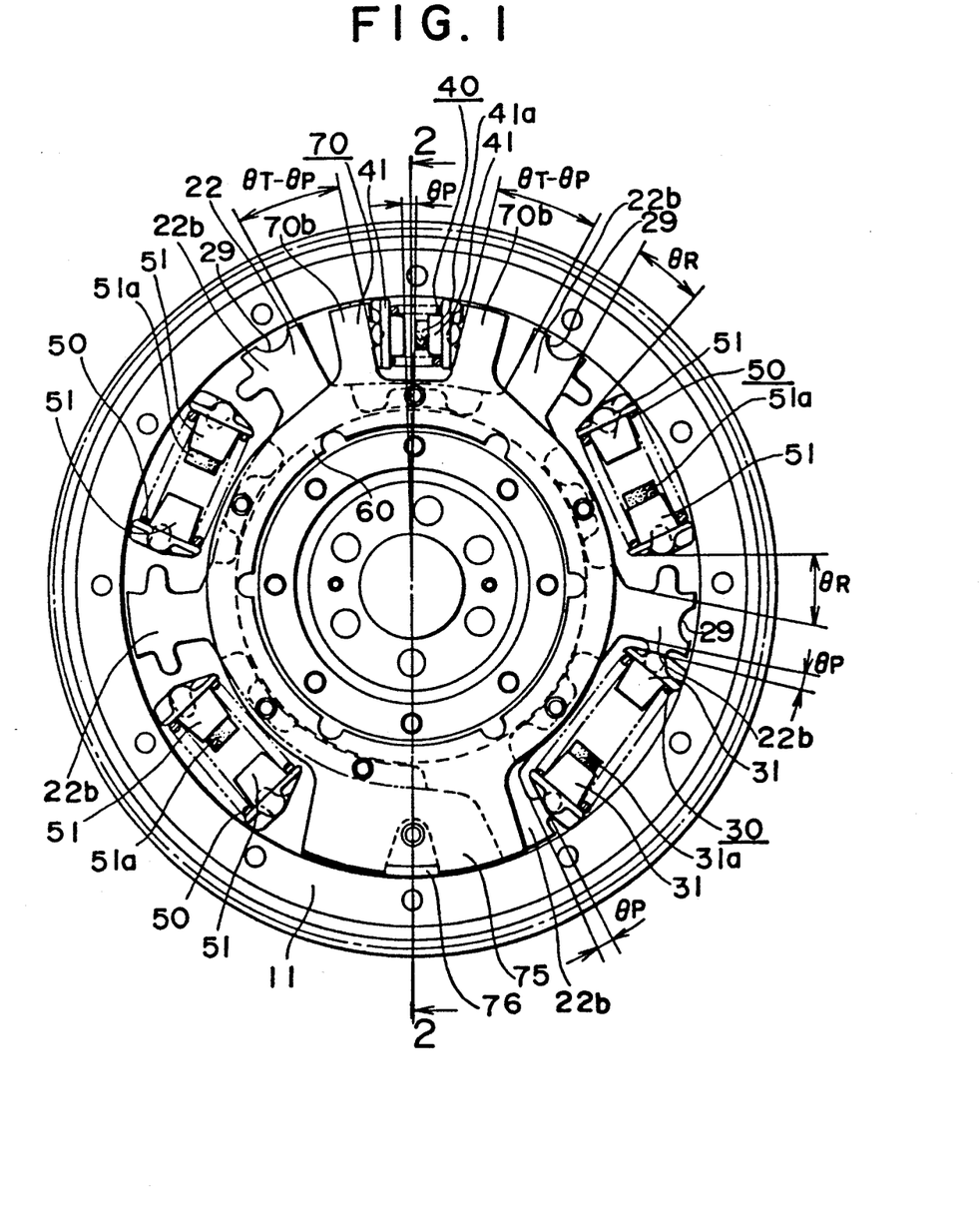
FIG. 1 is an elevational view of a torsional damper type flywheel device in balance in accordance with one embodiment of the present invention.

In FIG. 4, because the friction mechanism begins to slide at the torsional angle $\theta_P$ with the aid of the limiting mechanism S for limiting the operation of the K1 spring between $+\theta_P$ and $-\theta_P$, the maximum torque born by the K1 spring is limited to the predetermined frictional force Fr. As a result, it is not necessary to provide a plurality of K1 springs, and it is sufficient to provide only one K1 spring in a circumferential direction of the flywheel device. However, the single one K1 spring may be a double spring. The provision of a single K1 spring naturally makes the arrangement of the K1 spring asymmetric with respect to the axis of rotation of the flywheel device, as shown in FIG. 1. In FIG. 4, only the K1 spring operates between the torsional angles $+\theta_P$ and $-\theta_P$, and only the K spring operates between the torsional angles $\theta_P$ and $\theta_R$ in an acceleration direction. Because a spring constant of the K spring is selected to be smaller than a spring constant of the K1 spring, the flywheel device can have two vibrational characteristics which will be explained below in more detail with reference to FIG. 5. Above the torsional angle $\theta_R$, when the K2 spring is provided, both the K spring and the K2 spring operate in compression in an acceleration direction. Thus, the provision of the K2 spring increases the torque capacity of the flywheel device. At the torsional angle $\theta_T$, all spring seats disposed at opposite ends of the springs are brought into engagement with respective opposite spring seats at cushions thereof to thereby greatly increase the torque capacity of the flywheel device.

As illustrated in FIG. 5, the torsional damper type flywheel device having the vibrational system shown in FIG. 3 has a vibrational characteristic quite different from that of a conventional flywheel device. More particularly, conventional flywheel devices are designed to have a single vibrational characteristic having a single resonance point throughout the entire range of rotational speeds of the flywheel device, whereas the flywheel device of the invention has two kinds of vibrational characteristics having respective resonance points different from each other. In the flywheel device of the invention, the flywheel device changes its characteristic between the two vibrational characteristics. One of the two characteristics which appears between torsional angles $+\theta_P$ and $-\theta_P$ of FIG. 4 is a characteristic wherein only the K1 spring operates because the angular gap $\theta_P$ and the angular gap $\theta_R$ make the K spring and K2 spring, respectively, ineffective. Such characteristic will be called a K1 characteristic hereinafter. Another characteristic which appears above the torsional angle $\theta_P$ and below the torsional angle $\theta_R$ is a characteristic wherein only the K spring operates and the K1 spring is made ineffective through the sliding of the friction mechanism. Such characteristic will be called a K characteristic hereinafter. The K1 characteristic appears at the standard range of engine speeds set above the idling speed of the engine and at very low speeds at the time of a start-up and stopping of the engine, whereas the K characteristic appears at a high torque operation such as when the engine speed passes through the resonance point of the K1 characteristic during a start-up and stopping of the engine. More particularly, when the speed N approaches the resonance point of the K1 characteristic during the start-up and stopping of the engine within ranges A and E in FIG. 5, the torsional angle between the drive side and driven side flywheels increases and finally reaches the torsional angle $\theta_P$. At the same time, the friction mechanism begins to slide to make the K1 spring ineffective while the K spring is brought into operation. Thus, in FIG. 5, the characteristic of the system shifts from point P to point Q or from point Q to point P along line B accompanied by sliding of the friction mechanism, and it changes from the K1 characteristic to the K characteristic. Because the resonance point of the K characteristic is different from that of the K1 characteristic, the rotational speed of the system jumps the resonance point of the K1 characteristic. When the speed of the system further changes in the direction away from the resonance point of the K1 characteristic, the amplitude of vibration decreases and the torsional angle decreases to an angle less than the angular gap $\theta_P$. At the same time, the K spring is brought out of operation and the sliding of the friction mechanism stops so that the K1 spring is effective, and the system again operates according to the K1 characteristic. In this way, the system has no notable resonance throughout the entire range of engine speeds. Further, because the friction mechanism only momentarily slides when the engine speed approaches the resonance point of the K1 characteristic, and because no frictional force acts on the flywheel device at the standard range of engine speeds, the acceleration transmissibility characteristic J, that is the speed or torque variation absorbing characteristic, of the flywheel device of the invention is greatly improved at the standard range of engine speeds. This is easily understood from the fact that an acceleration transmissibility of an integral or non-divisional type flywheel device is equal to 1 and any frictional force acting between a drive side and a driven side of a divisional type flywheel device makes the divisional type flywheel device act similar to an integral one.

Figure 2:
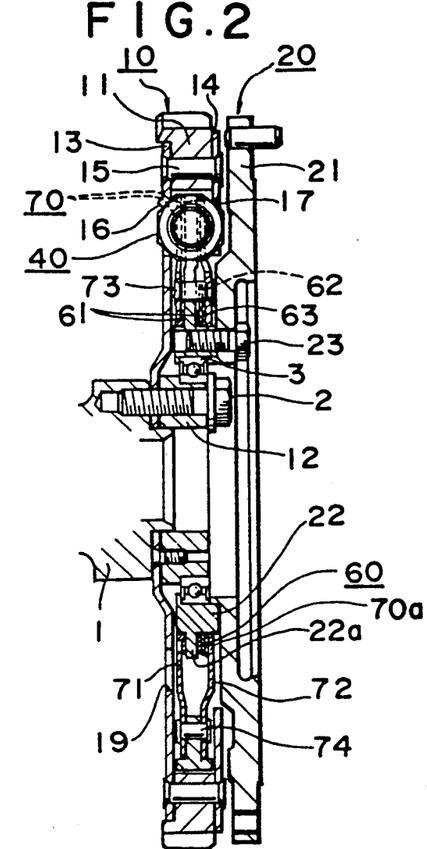
FIG. 2 is a cross-sectional view of the flywheel device of FIG. 1.

FIGS. 1 and 2 illustrate the details of the entire structure of the flywheel device having the system shown in FIG. 3. As shown in FIGS. 1 and 2, the torsional damper type flywheel device of the invention includes a drive side flywheel 10 rotatable about an axis of rotation of the flywheel device, a driven side flywheel 20 arranged coaxially with respect to drive side flywheel 10 and rotatable relative to drive side flywheel 10, a control plate 70 arranged between and rotatable relative to the drive side and driven side flywheels 10 and 20, one K spring 30 connected between the drive side and driven side flywheels 10 and 20 with an angular gap $\theta_P$, one K1 spring 40 connected between drive side flywheel 10 and control plate 70 and arranged in parallel with K spring 30 as a spring arrangement, and the friction mechanism 60, which has the predetermined frictional force Fr, connected between control plate 70 and driven side flywheel 20 and arranged in series with K1 spring 40 as a vibrational system. Three K2 springs 50, which are not absolutely necessary for the flywheel device to have the above-discussed two kinds of characteristics, are provided between the drive side and driven side flywheels 10 and 20, with an angular gap $\theta_R$ greater than the angular gap $\theta_P$ provided thereto.

As shown in FIG. 1, at least one of the K and K1 springs 30 and 40, and K2 springs 50 when they are provided, is asymmetrically arranged with respect to the axis of rotation of the flywheel device so as to extend in the circumferential direction of the flywheel device. Such asymmetrically arranged spring is naturally accompanied by asymmetric configurations of spring engaging components for example, drive side flywheel 10, driven side flywheel 20, and control plate 70. Such asymmetrically arranged spring and asymmetrical components result in a total, original imbalance A with respect to the axis of rotation (see FIG. 9). The flywheel device further includes a compensating imbalance A' equal and opposite to the total, original imbalance as a vector (see FIG. 9). The compensating imbalance A' is equally divided into two portions A'/2 (see FIG. 9), one of which is formed in the drive side and another of which is formed in the driven side of the flywheel device.

As illustrated in FIG. 2, drive side flywheel 10 includes an outer ring 11 including a ring gear, an inner ring 12 disposed radially inside and spaced from outer ring 11, a pair of drive plates 13 and 14 disposed on opposite sides of outer ring 11 and fixed to outer ring 11 by rivets 15. Inner ring 12 is fixed to drive plate 13. Drive side flywheel 10 is fixed to an engine crankshaft 1 by a set bolt 2 so as to rotate together with engine crankshaft 1. Drive plate 13 has openings 16 formed therein, and drive plate 14 has slots 17 or openings formed therein. Openings 16 and slots 17 extend in the circumferential direction of the flywheel device, and portions of the drive plates 13 and 14 defining circumferential ends of openings 16 and slots 17 detachably engage spring seats 31, 41 and 51 disposed at opposite ends of the K, K1 and K2 springs 30, 40 and 50, respectively, which are located in the openings and slots.

As illustrated in FIG. 2, driven side flywheel 20 includes a flywheel body 21 disposed so as to oppose drive side flywheel 10 in the axial direction of the flywheel device and a driven plate 22 fixed to flywheel body 21 by bolts 23. Driven side flywheel 20 is rotatably mounted to inner ring 12 of drive side flywheel 10 via a bearing 3 so as to be supported at driven plate 22. Driven side flywheel 20 is coupled to a power train of a vehicle.

Figure 7:
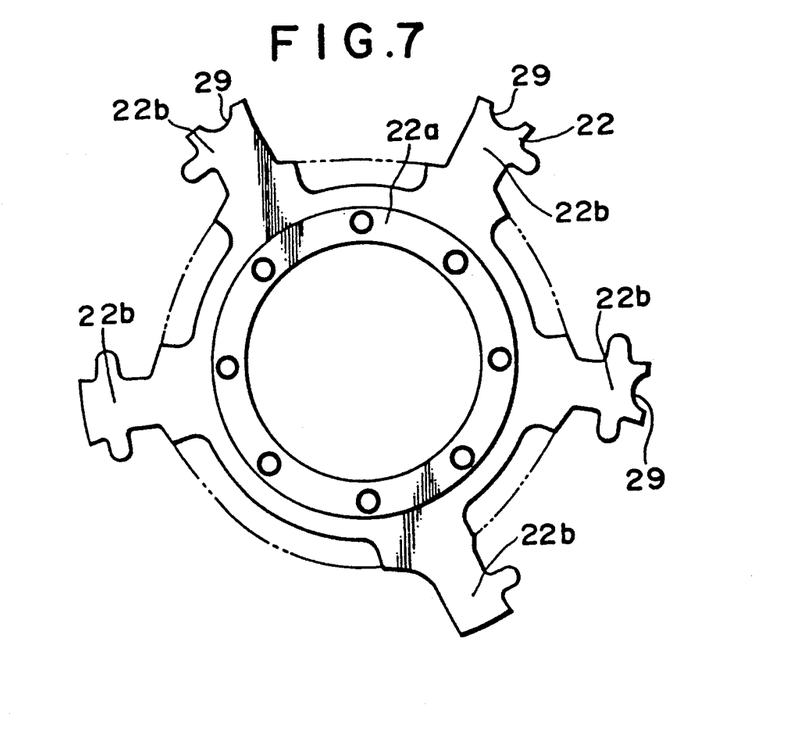
FIG. 7 is an elevational view of a driven plate of the flywheel FIG. 1.

As illustrated in FIG. 7, driven plate 22 of driven side flywheel 20 includes an annular portion 22a and arms 22b extending radially outwardly from annular portion 22a of the driven plate. A plurality of arms 22b are provided, and arms 22b are asymmetrically configured with respect to the axis of rotation of the flywheel device.

As illustrated in FIG. 1, the one K spring 30 is asymmetrically arranged with respect to the axis of rotation of the flywheel device. K spring 30 detachably engages walls of openings 16 and slots 17 (see FIG. 2) formed in drive plates 13 and 14 of drive side flywheel 10 via spring seats 31 disposed at opposite ends of K spring 30 and opposes arms 22b of driven plate 22 with the angular gap $\theta_P$ in the circumferential direction of the flywheel device. When a torsional angle greater than the angular gap $\theta_P$ occurs, K spring 30 is brought into engagement with arms 22b of driven plate 22 via spring seat 31 to thereby transmit the torque between the drive side and driven side flywheels 10 and 20. At the torsional angles above the angular gap $\theta_P$, one end of K spring 30 is supported by drive plates 13 and 14, and another end of K spring 30 is detached from drive plate 13 and 14, pushed by arms 22b of driven plate 22, and supported by arms 22b of driven plate 22.

As shown in FIG. 1, the one K1 spring 40 is asymmetrically arranged with respect to the axis of rotation of the flywheel device. K1 spring 40 is detachably supported between arms 70b, described more fully below, of control plate 70 and detachably engages walls of openings 16 and slots 17 formed in drive plates 13 and 14 of drive side flywheel 10 via spring seats 41 disposed at opposite ends of K1 spring 40. When any amount of relative rotation occurs between control plate 70 and drive side flywheel 10, spring seat 41 disposed at one end of K1 spring 40 is pushed by arm 70b of control plate 70 to be detached from the walls of openings 16 and slots 17 of drive plates 13 and 14. At this state, the one end of K1 spring 40 is supported by arm 70b of control plate 70, while another end of K1 spring 40 is supported by drive plates 13 and 14 of drive side flywheel 10.

As illustrated in FIG. 1, the three K2 springs 50 are, as a whole, asymmetrically arranged with respect to the axis of rotation of the flywheel device. More particularly, because the three K2 springs 50 are in parallel with each other, a spring constant of each K2 spring 50 should be selected to be K*2/3 so that the synthetic spring constant of the three K2 springs 50 is K2. Each K2 spring 50 detachably engages walls of openings 16 and slots 17 formed in drive plates 13 and 14 of drive side flywheel 10 in the circumferential direction of the flywheel device via spring seats 51 disposed at opposite ends of each K2 spring 50. Spring seats 51 oppose arms 22b of driven plate 22 with the angular gap $\theta_R$ in the circumferential direction of the flywheel device. When a relative rotation greater than the angular gap $\theta_R$ occurs between the drive side and driven side flywheels 10 and 20, spring seat 51 is brought into engagement with arm 22b of driven plate 22 to transmit the torque between the drive side and driven side flywheels 10 and 20. When spring seat 51 is not in engagement with arm 22b of driven plate 22, K2 spring 50 is supported by drive plates 13 and 14 at the opposite ends of K2 spring 50. When spring seat 51 is in engagement with arm 22b of driven plate 22, K2 spring 50 is supported by driven plate 22 at one end of K2 spring 50 and is supported by drive plates 13 and 14 at the other end of K2 spring 50.

As shown in FIG. 2, friction mechanism 60 is provided between annular portion 22a of driven plate 22 and an annular portion 70a, described below, of control plate 70 and includes a thrust lining 61 constructed of abrasive material, a thrust plate 62 constructed of metal, and a cone spring 63 constructed of spring metal. Cone spring 63 is set in a pre-compression state so as to generate a force in the axial direction of the flywheel device to define the predetermined frictional force Fr of friction mechanism 60.

Figure 6:
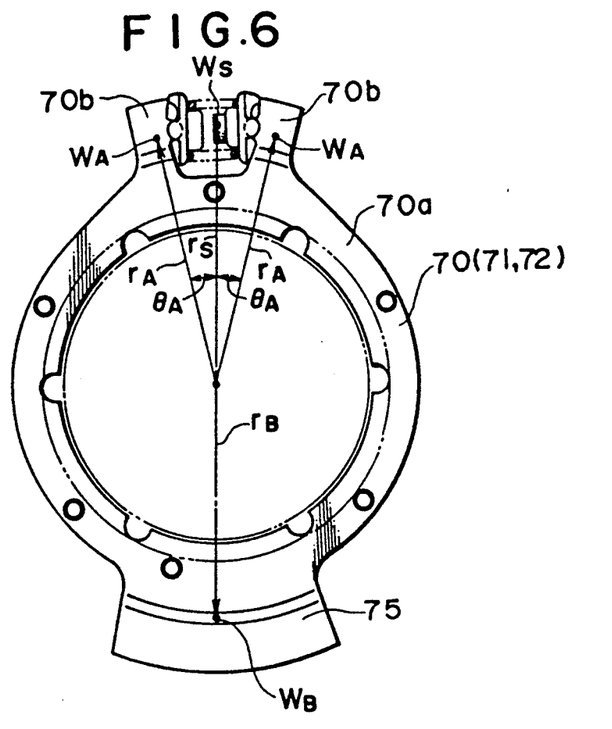
FIG. 6 is an elevational view of a control plate of the flywheel device of FIG. 1.

As shown in FIG. 2, control plate 70 comprises an assembly of control plate elements 71 and 72 coupled to each other by rivets 73 and 74. Further, as shown in FIG. 6, control plate 70 includes an annular portion 70a and two arms 70b extending radially outwardly from the annular portion 70a of control plate 70. K1 spring 40 is disposed between arms 70b of control plate 70 so as to be detachable from arms 70b in the circumferential direction of the flywheel device. An inside surface of annular portion 70a of control plate 70 slidably contacts an outer surface of annular portion 22a of driven plate 22 so that control plate 70 is rotatably supported by driven plate 22. A side surface of annular portion 70a of control plate element 71 slidably engages thrust lining 61 of friction mechanism 60.

Figure 8:
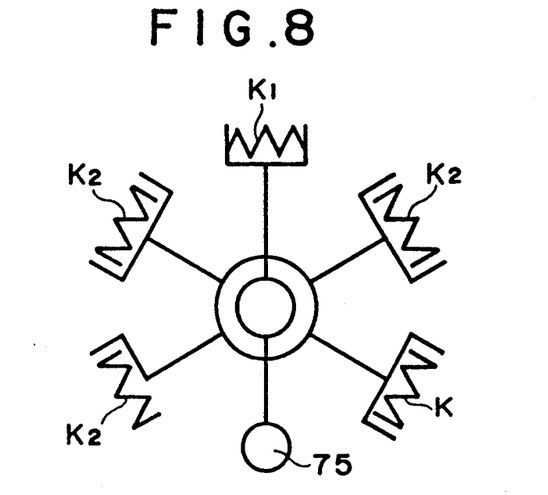
FIG. 8 is a schematic illustration showing the relationship between a balancer and springs of the flywheel device of FIG. 1.

Because control plate 70 is not supported via a high reliable structure such as a ball bearing, and because control plate 70 must support one end of K1 spring 40 when arm 70b of control plate 70 pushes K1 spring 40, control plate 70 is preferably balanced by itself, independently of other components. Thus, as illustrated in FIG. 8, a balancer 75 is provided to control plate 70 at a portion of control plate 70 opposite to K1 spring 40 with respect to the axis of rotation of the flywheel device. Balancer 75 may be formed integrally with control plate 70 or may be manufactured separately therefrom and then attached to control plate 70. A moment of inertia of balancer 75 with respect to the axis of rotation of the flywheel device is determined so as to be equal and opposite to a summation of (a) half of a moment of inertia of K1 spring 40 including spring seats 41 and (b) moments of inertia of arms 70b of control plate 70. Thus, the moment of inertia of balancer 75 is determined as follows:

$$W_b/g * r_B * w^2 = \tfrac{1}{2} * W_S/g * r_S * w^2 + 2 * W_A/g * r_A * w^{2*} \cos \theta_A$$

where, $W_B$ is a weight of balancer 75,
$W_S$ is a weight of K1 spring 40 including spring seats 41
$W_A$ is a weight of each arm 70b of control plate 70,
$r_B$, $r_S$, and $r_A$ are rotational radii of gravity centers of $W_B$, $W_S$, and $W_A$, respectively,
w is angular speed, and
g is the acceleration of gravity.

When the flywheel device rotates under a very low torque condition, the arm 70b of control plate 70 may push K1 spring 40 a little and thus may not support the one end of K1 spring 40. In such a state, a little imbalance may occur in control plate 70 due to balancer 75. For the purpose of bearing the imbalance, a bearing seat portion 76 (see FIG. 1) is preferably provided for balancer 75, which is designed so as to slidably contact the inside surface of outer ring 11 to bear the force at bearing seat 76.

Spring seats 31, 41, and 51 of the K, K1, and K2 springs 30, 40, and 50, respectively, include elastically deformable cushions 31a, 41a, and 51a, respectively, fixed to hard synthetic resin portions of the spring seats. Such cushions may be provided for only one of the opposite spring seats disposed at opposite ends of each spring. Cushions 31a, 41a, and 51a are brought into contact with respective opposite spring seats 31, 41, and 51 at the torsional angle $\theta_T$ of FIG. 4 to thereby greatly increase the spring constant at the torsional angle range above $\theta_T$ and to cause the flywheel device to bear a very high torque. At the range above the tortional angle $\theta_T$, the characteristic draws a hysteresis due to the rubber of the cushions as shown in FIG. 4.

The above-described torsional damper type flywheel device includes the following original imbalance causing members:

(a) K spring 30 and K1 spring 40, and K2 spring 50 when K2 spring 50 is provided, which are asymmetrically arranged with respect to the axis of rotation;

(b) Control plate 70, and, in particular, arms 70b, balancer 75, and bearing seat 76 thereof which are asymmetrically configured with respect to the axis of rotation;

(c) Driven plate 22, and, in particular, arms 22b thereof which are asymmetrically configured with respect to the axis of rotation; and (d) Drive plates 13 and 14, and, in particular, the removed mass of openings 16 and slots 17 which are asymmetrically formed with respect to the axis of rotation.

These members cooperate to cause a total, original imbalance A (see FIG. 9) which should be balanced by a compensating imbalance A' (see FIG. 9).

For annuling the total, original imbalance A, at least one hole 19 (see FIG. 2) is formed in drive side flywheel 10, preferably in drive plate 13 of drive side flywheel 10, and at least one notch 29 (see FIG. 1) is formed in driven side flywheel 20, preferably in driven plate 22 of driven side flywheel 20. Hole 19 and notch 29 cooperate to each other to form the compensating imbalance A' when no relative rotation exists between the drive side and the driven side, which is equal and opposite to the total, original imbalance A with respect to the axis of rotation of the flywheel device, as shown in FIG. 9. A compensating imbalance component due to hole 19 and a compensating imbalance component due to notch 29 are equal to each other, and therefore, each of the compensating unbalance components is equal to half of the original imbalance, that is, equal to A/2. More specifically, the compensating imbalance A' is determined by the following equations:

In the direction along x-axis fixed to, for example, drive side flywheel 10, $\Sigma(A_i/g)*a_i*w^{2*} \cos \theta 1i$ $+\Sigma(B_i/g)*b_i*w^{2*} \cos \theta 2i$ $+\Sigma(C_i/g)*c_i*w^{2*} \cos \theta 3i$ $+\Sigma(D_i/g)*d_i*w^{2*} \cos \theta 4i$ $+\Sigma(E_i/g)*e_i*w^{2*} \cos \theta 5i$ $+\Sigma(F_i/g)*f_i*w^{2*} \cos \theta 6i = 0$ In the direction along y-axis extending at a right angle with respect to the x-axis, $\Sigma(A_i/g)*a_i*w^{2*} \sin \theta 1i$ $+\Sigma(B_i/g)*b_i*w^{2*} \sin \theta 2i$ $+\Sigma(C_i/g)*c_i*w^{2*} \sin \theta 3i$ $+\Sigma(D_i/g)*d_i*w^{1*} \sin \theta 4i$ $-\Sigma(E_i/g)*e_i*w^{2*} \sin \theta 5i$ $-\Sigma(F_i/g)*f_i*w^{2*} \sin \theta 6i = 0$ where,
Ai: a weight of each arm 22b of driven plate 22,
ai: a distance between a gravity center of each arm 22b of driven plate 22 and the axis of rotation of the flywheel device,
$\theta 1i$: an angle defined between a vector of ai and the x-axis,
and, similarly,

|  | weight | distance | angle |
| --- | --- | --- | --- |
| Each spring | Bi | bi | $\theta 2i$ |
| Control plate | Ci | ci | $\theta 3i$ |
| Drive plate | Di | di | $\theta 4i$ |
| Hole | Ei | ei | $\theta 5i$ |
| Notch | Fi | fi | $\theta 6i$ |

As will be clear from the foregoing, compensating imbalance A' is divided into two compensating imbalance components A'/2 and A'/2 which are equal to each other in centrifugal force $(m*r*w^2)$ which will be generated when the flywheel device is rotated. The two compensating imbalance components are distributed to the drive side and the driven side of the flywheel. More particularly, one of the two compensating imbalance components in constructed of added or removed mass means formed in drive side flywheel 10. For example, at least one hole 19 (see FIG. 2) is formed in drive side plate 13 of drive side flywheel 10. The other of the two compensating imbalance components is constructed of added or removed mass means formed in drive side flywheel 20. For example, at least one notch (see FIG. 1) is formed in driven plate 22 of driven side flywheel 20.

Correction hole 19 and notch 29 for defining the compensating imbalance A' should be formed before assembly of the flywheel device at the manufacturing stage of the members of the flywheel device. The hole 19 and notch 29 are preferably formed through press at the same time with press-formation of drive plate 13 and driven plate 22 for the purpose of preventing manufacturing steps from being increased.

Next, balancing of the flywheel device will be explained with reference to FIG. 9.

In FIG. 9, when no relative rotation exists between the drive side and the driven side, the vector of the total, original imbalance A of the flywheel device which is defined as a vector synthesis of the imbalances of the springs 30, 40, and 50; driven plate 22 including arms 22b; control plate 70 including arms 70b and balancer 75; and drive plates 13 and 14 including removed masses of openings 16 and recesses 17, is directed in a direction toward point g. The vector of the compensating imbalance A' which is defined as a vector synthesis of the compensating imbalance component A'/2 formed in drive side flywheel 10, hole 19 of drive plate 13, and the compensating imbalance component A'/2 formed in driven side flywheel 20, notch 29 of driven plate 22, is equal in magnitude and opposite in direction to the total, original imbalance A. Thus, the flywheel is in perfect balance.

On the other hand, when a torque acts on the flywheel device and thus a relative rotation $\theta$ occurs between the drive side and driven side flywheels 10 and 20, the total, original imbalance A rotates by substantially an angle $\theta/2$ about the axis of rotation of the flywheel device and is directed toward point g'. At that time, one of the vectors of the compensating imbalance components, that is one of the vector of a first component A'/2 due to the removed mass of hole 19 and the vector of a second component A'/2 due to the removed mass of notch 29, rotates by an angle $\theta$ relative to the other. As a result, the vector of the compensating imbalance A'' which is a vector synthesis of the two vector components is angularly offset from the initial compensating imbalance A' by an angle $\theta/2$ and coincides in direction with the rotated original imbalance A, though the magnitude of the compensating unbalance A'' is a little smaller than that of the original imbalance A, as was described above. However, because the differential between the magnitude of the vector of the compensating imbalance A'' and the magnitude of the vector of the original imbalance A is of a sufficiently small order, as noted above, it can be said that the flywheel device is in balance even when a relative rotation exists.

According to the present invention, the following effects are obtained.

First, because the compensating imbalance A' is equally divided and distributed to the drive side and the driven side flywheels, the flywheel device can be maintained in balance whether or not a relative rotation occurs between the drive side and driven side flywheels. As a result, all of the flywheel device components, including the springs, can be substantially freely designed without symmetrically arranging or configuring those members. This will result in a decrease in cost and an increase of in the structural strength of the flywheel device.

Second, because the compensating imbalance A' is formed before assembly of the flywheel device, balancing work after assembly of the flywheel device is as slight as that for a conventional flywheel device, though the total, original imbalance A thereof is far greater than the imbalance of the conventional flywheel devices. In this connection, if the compensating imbalance defining means, for example, a hole to be formed in the drive plate and a notch to be formed in the driven plate, are press-formed during the press-formation of the drive plate and the driven plate, respectively, no additional manufacturing step is necessary to form the compensating imbalance.

Third, though at least one of the springs is asymmetrically arranged with respect to the axis of rotation of the flywheel device, it is not necessary to provide an idler spring for compensating the asymmetrically arranged spring at a position opposite to the asymmetrically arranged spring with respect to the axis of rotation. Thus, the number of springs can be determined solely on the basis of a damping characteristic, not from balancing. This further increases the freedom of design of the flywheel device and will decrease the cost of the flywheel device.

Although a few preferred embodiments of the present invention have been described in detail, it will be appreciated by those skilled in the art, that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A torsional damper type flywheel device having a plurality of components and wherein at least one of the components has an asymmetric configuration or is asymmetrically disposed with respect to an axis of rotation of the flywheel device so that the flywheel device has a total, original imbalance, the flywheel device including:

means constructed of an added or removed mass for providing a compensating imbalance, equal in magnitude of a force and opposite in direction of a force to the total, original imbalance as a centrifugal force vector, equally divided into two portions each distributed respectively to a drive side and a driven side of the flywheel device, the means for providing a compensating imbalance being defined in the drive side and the driven side of the flywheel device before assembly of the flywheel device.

2. A torsional damper type flywheel device comprising:

a drive side flywheel rotatable about an axis of rotation;

a driven side flywheel rotatable relative to the drive side flywheel about the axis of rotation;

a control plate rotatable relative to the drive side and driven side flywheels about the axis of rotation;

a plurality of springs, at least one of which is arranged between the drive side flywheel and the control plate and the remaining of which are arranged between the drive side and driven side flywheels, at least one of the plurality of springs being asymmetrically arranged with respect to the axis of rotation and at least one of the drive side, the drive side flywheels, and the control plate being asymmetrically configured to form a total, original imbalance of the flywheel device; and means constructed of an added or removed mass for providing a compensating imbalance which is equal in magnitude of a force and opposite in direction of a force to the original imbalance as a centrifugal force vector and is equally divided into two portions each distributed respectively to the drive side and driven side flywheels, the means for providing a compensating imbalance being defined in the drive side and driven side flywheels before assembly of the flywheel device.

3. The flywheel device according to claim 2 further comprising a friction mechanism mounted so as to begin sliding when a torque acting on the friction mechanism exceeds a predetermined frictional force, wherein said plurality of springs includes a first spring arranged between the drive side and driven side flywheels with a predetermined angular gap and a second spring arranged between the drive side flywheel and the control plate, the friction mechanism being arranged in series with the second spring and the series arrangement of the second spring and the friction mechanism being arranged in parallel with the first spring, each of the first and second springs being asymmetrically arranged with respect to the axis of rotation.

4. The flywheel device according to claim 3 wherein said plurality of springs further comprises at least one third spring arranged between the drive side and driven side flywheels with a second angular gap greater than the angular gap of the first spring, the third spring being arranged in parallel with the first spring and the series arrangement of the second spring and the friction mechanism.

5. The flywheel device according to claim 4, wherein three third springs are provided and the three third springs are, as a whole, asymmetrically arranged with respect to the axis of rotation.

6. The flywheel device according to claim 2, wherein the drive side flywheel includes:
   an outer ring;
   an inner ring disposed radially inside and spaced from the outer ring; and
   drive plates disposed on opposite sides of the outer ring, the drive plates being fixed to the outer ring and the inner ring being fixed to one of the drive plates, each of the drive plates including at least one opening or slot formed therein to support said at least one asymmetrical spring therein and the opening or slot being asymmetrically formed with respect to the axis of rotation corresponding to the asymmetric arrangement of said spring, the portion of the compensating imbalance defining means provided in the drive side flywheel comprising at least one hole formed in at least one of the drive plates.

7. The flywheel device according to claim 2, wherein the driven side flywheel includes:
   a flywheel body;
   a driven plate fixed to the flywheel body, the driven side flywheel including an annular portion and arms extending radially outwardly from the annular portion of the driven plate, the arms of the driven plate being asymmetric with respect to the axis of rotation corresponding to the asymmetric arrangement of the at least on asymmetrical spring, the portion of the compensating imbalance defining means provided in the driven side flywheel comprising at least one notch formed in at least one of the arms of the driven plate.

8. The flywheel device according to claim 2 further comprising a balancer provided to the control plate, wherein the control plate includes two radially extending arms, said spring arranged between the drive side flywheel and the control plate being supported between the arms of the control plate, the balancer being disposed at a portion of the control plate opposite to the spring supported between the arms of the control plate with respect to the axis of rotation and having a weight equal to a summation of one half a weight of the spring supported between the arms of the control plate and weights of the arms.

9. The flywheel device according to claim 8, wherein the drive side flywheel includes an outer ring having an inside surface and the balancer further including a bearing seat fixed to the balancer, the balancer contacting the inside surface of the outer ring of drive side flywheel at an outside surface of the bearing seat.

10. A torsional damper type flywheel device comprising:
    a drive side flywheel rotatable about an axis of rotation;
    a driven side flywheel rotatable relative to the drive side flywheel about the axis of rotation;
    a control plate rotatable relative to the drive side and driven side flywheels about the axis of rotation, the control plate having two radially extending arms;
    a plurality of springs, one of which is arranged between the drive side flywheel and the control plate and the remaining of which are arranged between the drive side and driven side flywheels, the one spring arranged between the drive side flywheel and the control plate being detachably supported by the drive side flywheel and between the arms of the control plate so that the one spring is supported by the drive side flywheel at one end of the one spring and by one of the arms of the control plate at the other end of the one spring when a relative rotation occurs between the drive side flywheel and the control plate; and
    a balancer provided to the control plate so as to be disposed at a portion of the control plate exactly opposite to the spring supported between the arms of the control plate with respect to the axis of rotation and having a weight equal to a summation of one half a weight of the one spring supported between the arms of the control plate and weights of the arms of the control plate.

11. The flywheel device according to claim 10, wherein the drive side flywheel includes an outer ring having an inside surface and the balancer further including a bearing seat fixed to the balancer, the balancer contacting the inside surface of the outer ring of drive side flywheel at an outside surface of the bearing seat.

* * * * *